(12) United States Patent
Reyes et al.

(10) Patent No.: US 11,310,206 B2
(45) Date of Patent: Apr. 19, 2022

(54) IN-LINE COGNITIVE NETWORK SECURITY PLUGIN DEVICE

(71) Applicant: KYNDRYL, INC., New York, NY (US)

(72) Inventors: Joseph Reyes, Pelham, NY (US); Bernhard Julius Klingenberg, Grover Beach, CA (US); Hamza Yaswi, Sterling, VA (US)

(73) Assignee: Kyndryl, Inc., New York, NY (US)

( * ) Notice: Subject to any disclaimer, the term of this patent is extended or adjusted under 35 U.S.C. 154(b) by 314 days.

(21) Appl. No.: 16/532,589

(22) Filed: Aug. 6, 2019

(65) Prior Publication Data

US 2021/0044563 A1    Feb. 11, 2021

(51) Int. Cl.
*H04L 9/40* (2022.01)
*H04L 29/06* (2006.01)

(52) U.S. Cl.
CPC ........ *H04L 63/029* (2013.01); *H04L 63/1416* (2013.01); *H04L 63/1425* (2013.01)

(58) Field of Classification Search
CPC ............... H04L 63/1425; H04L 43/062; H04L 63/1466; H04L 63/1416; H04L 63/0236;
(Continued)

(56) References Cited

U.S. PATENT DOCUMENTS 7,112,866 B2    9/2006 Chan
7,216,365 B2    5/2007 Bhagwat
(Continued)

FOREIGN PATENT DOCUMENTS

WO    2016071904 A1    5/2016

OTHER PUBLICATIONS

Gelenbe et al. "Security for smart mobile networks: The NEMESYS approach." 2013 International Conference on Privacy and Security in Mobile Systems (PRISMS). IEEE, 2013, 8 pages.
(Continued)

*Primary Examiner* — Olugbenga O Idowu
(74) *Attorney, Agent, or Firm* — Schmeiser, Olsen & Watts, LLP; Ken Han

(57) ABSTRACT

Systems, methods, and computer program products providing network security leveraging analytics and physical separation between computer systems and a network to prevent threats from infecting network devices. A specialized pluggable dongle like security device is inserted between ports of computer system(s) connecting to the network and port(s) of network hardware facilitating connections between the computer system and computer network. The security device uses a combination of onboard analytics and cloud-based analytic services to detect incoming threats from network traffic and whether to allow network traffic to pass through the security device and/or prevent network traffic from entering the computer system. In response to detected network threats, an out of band management network communicating with the security device can open or close a physical gate onboard the security device, which, when opened introduces an air gap between the network and computer system, preventing harmful network traffic from entering the computer system.

20 Claims, 7 Drawing Sheets

(58) Field of Classification Search
CPC ...... G06F 21/55; G06F 21/554; G06F 21/564; G06F 21/566
See application file for complete search history.

(56) References Cited

U.S. PATENT DOCUMENTS

| | | | |
|---|---|---|---|
| 7,403,794 | B2 | 7/2008 | Tsuchiuchi |
| 2007/0261112 | A1* | 11/2007 | Todd .................. H04L 63/1483 726/2 |
| 2010/0162392 | A1 | 6/2010 | Jeong |
| 2014/0082728 | A1 | 3/2014 | Kim |
| 2015/0341379 | A1* | 11/2015 | Lefebvre ............ H04L 63/1425 726/22 |
| 2017/0305368 | A1 | 10/2017 | Markham |
| 2018/0255022 | A1* | 9/2018 | Kuperman ......... H04L 63/1425 |

OTHER PUBLICATIONS

Gelenbe et al.,. "A self-aware approach to denial of service defence." Elsevier, ScienceDirect, Computer Networks 51.5 (2007): 1299-1314, 1389-1286/ © 2006 Elsevier B.V., doi:10.1016/j.comnet.2006.09.009. 16 pages.

Laaboudi, Younes, "Reactive security of IoT communications." Degree Project in Computer Science and Engineering, Second Cycle, 30 Credits Stockholm, Sweden 2019, Jan. 25, 2019, 68 pages.

Talluri et al. "Cryptanalysis and security enhancement of two advanced authentication protocols." Accepted at ICACNI 2014, 9 pages.

"NetFlow", Wikipedia, Last edited Jul. 5, 2019, 4 pages, <https://en.wikipedia.org/w/index.php?title=NetFlow&oldid=904872464>.

"What is Dell Endpoint Security Suite Enterprise", Article ID: SLN304331, Last Date Modified: Jun. 5, 2019, 2 pages.

\* cited by examiner

IN-LINE COGNITIVE NETWORK SECURITY PLUGIN DEVICE

TECHNICAL FIELD

The present disclosure relates generally to the field of computer network security and more specifically to cyber-attack detection, prevention and mitigation.

BACKGROUND

Cyber security is a practice of defending computer systems, electronic systems, and network infrastructure, including personal computers, mobile devices, servers, enterprise networks, network storage devices and data from malicious attacks. Cyber security can refer to a body of technologies, processes, and practices that are designed to protect networks, devices, programs and data from attack, damage or unauthorized access. Cyber security can be applied to a variety of contexts and can be categorized by the type of security provided. For example, network security, application security, information security, operational security, incident recovery, and end user security education. Common methods that threaten the security of various computer systems and networks and may be used to take control of the computer or network by spreading malicious code. For example, by proliferating code commonly referred to as a virus, worm, spyware, trojan, malware or ransomware.

SUMMARY

A first embodiment of the present disclosure relates to a computer-implemented method, an associated computer system and computer program product providing network security for a computer network. A security device is connected inline between a first port placed in communication with a network computer system and a second port placed in communication with one or more pieces of network hardware of the computer network. The security device intercepts network traffic of the computer network flowing from the network hardware to the network computer system, analyzes the network traffic intercepted by the security device for a threat level exceeding a pre-set safe level and modulates a gate (which may be physical or logical) of the security device as a function of the threat level, by opening the gate in response to a detected security threat to create an air gap preventing network traffic from passing from the second port through the security device to the first port in communication with the network computer system.

DETAILED DESCRIPTION

Overview

Figure 1A:
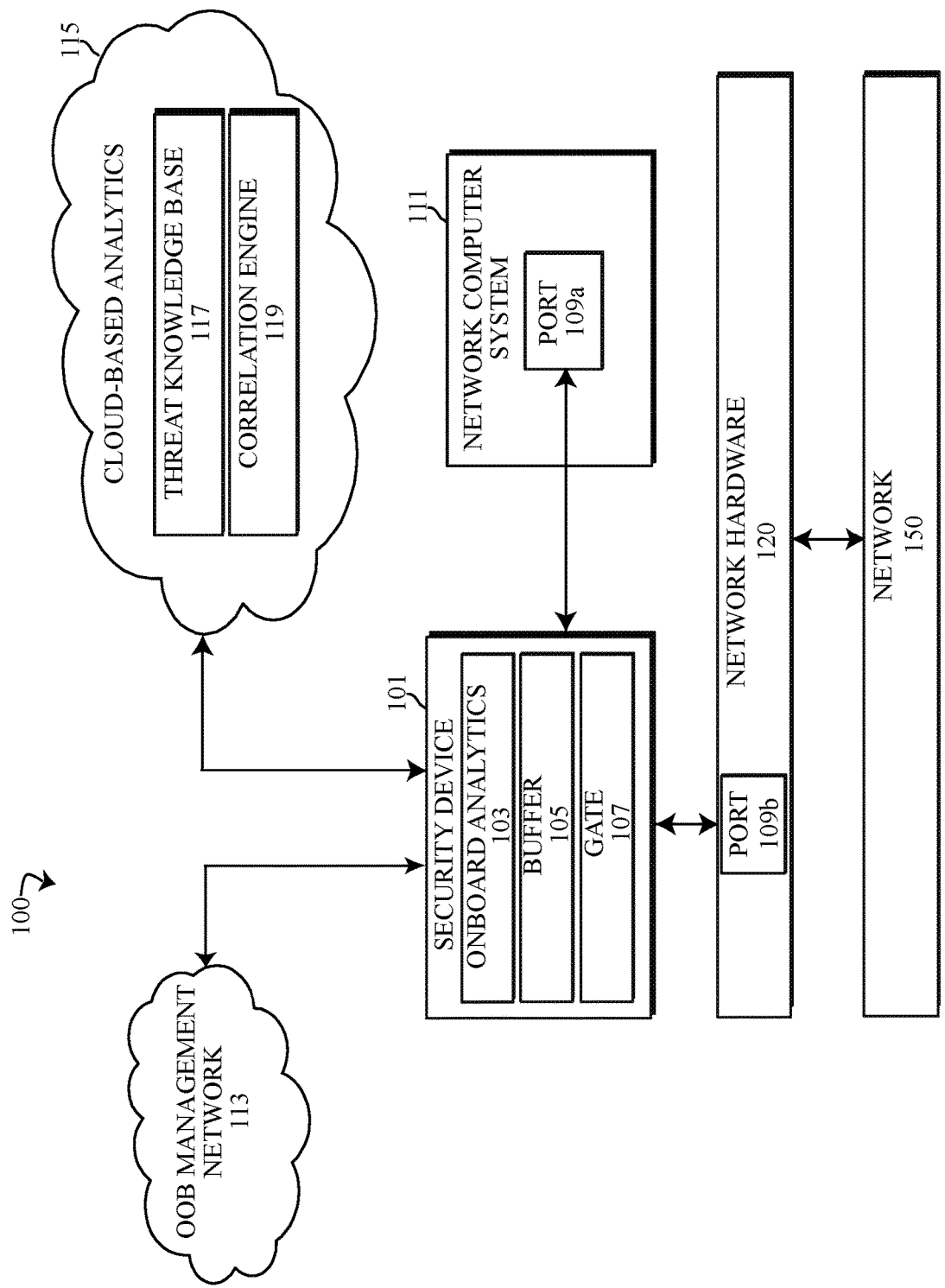
FIG. 1a depicts a functional block diagram describing an embodiment of a computing environment comprising an in-line network security device in accordance with the present disclosure.

Securing computer networks from cyber-attacks, malicious code and other harmful threats can be an invaluable measure toward preserving and protecting network data and network infrastructure. Identifying threats and preventing the spread of malicious code by limiting intruder access to computer systems of a network in order to isolate the spread of the threats throughout the network can prevent data loss, data theft and damage to the network. Embodiments of the present disclosure secure a network of computer systems by inserting a specialized pluggable computing device (a security device) that may be constructed as a dongle, a dongle-like form factor or other type of plug-and-play form factor capable of being connected inline between components of a network, network computer systems or devices and/or a network's hardware facilitating the connection of network computer systems to the network. For example, the security device can be constructed as a dongle using a form factor capable of plugging into any of the ports present on the network computer system and the network hardware. For example, a port 109b of a network switch or router on one side of the network hardware 120 and an RJ-45 cable or optical fiber on the other side of the network hardware 120. Thus enabling the network switch, router or other network hardware to take advantage of the functionalities provided by the pluggable security device 101 while interconnected between the network hardware 120 and the network computer system 111. The security device 101 may bridge the gap between the network hardware and the network computer system by using a physical or logical gate to control the flow of network traffic between the network computer system and the network. Embodiments of the security device may be managed by an out-of-band (OOB) network, allowing for the management plane of the security device to control the functions of the security device while being isolated from any threats or cyber-attacks that may occur.

Embodiments of the security device 101 improve upon the functionality of existing network security devices by leveraging the use of onboard analytics within the security device itself, cloud-based analytics services and machine learning techniques to analyze threats passing through or intercepted by the security device as part of the network traffic between the network and the network computer systems. By using both onboard analytics within the security device (e.g. an application-specific integrated circuit (ASIC)) and cloud-based analytics services, the security provided by the security device can provide quick and up-to-date decision making without requiring large amounts of bandwidth or processing to be effective. Embodiments of the security device, presented herein as computer implemented methods, systems and computer program products improve over security solutions using onboard analytics or cloud-based analytic services alone because on-board-only solutions may suffer from limited processing and being unaware of new threats or global trends, while cloud-based only solutions may suffer from lag time and large amounts of bandwidth requirements due to constant transmission of data being sent to the cloud for processing.

Embodiments of the present disclosure may balance the implementation of onboard analytics and cloud-based analytics to detect and assess the presence of a security threat. Onboard analytics may operate as a first level of threat detection to identify anomalies in the network traffic entering the security device from network hardware. Threat levels assessed below a pre-set threshold level set by the OOB management network, may allow for network traffic to passively pass through the security device by placing a physical gate or logical diode-based gate in a closed position when there is a lack of a threat or low-level risk of a threat. Likewise, anomalies that are identified by onboard analytics of the security device, detected at a maximum threat level or threat level range set by the OOB management network, may result in the opening of the physical or logical diode-based gate, creating an air gap and breaking the electrical and communicative connection between the network hardware of the computer network and the network computer system, physically disconnecting the network computer system from the computer network. Additionally, anomalies detected by the onboard analytics with a threat level above the pre-set threshold and below the maximum threat level or threat level range, may result in the buffering of the network traffic while a decision is made by a second level of security analysis, performed by a cloud-based analytics services. Metadata and/or compressed data of the network traffic may be transmitted to the cloud-based analytics services for further analysis and processing of the potential threat. Based on the analysis of the cloud-based analytics determining whether the network traffic is a threat to the network computer system receiving the data, the gate of the security device may be placed in the open or closed position. Network traffic determined not to be a threat by the cloud-based analytics, may be released from the buffer and allowed to pass through the gate to the intended destination on the network, while the detection of a security threat may result in opening the gate of the security device, disconnecting the network connection. Decisions by the cloud-based services may be logged and used as a basis for processing similar requests by other security devices of the computer network, or other networks that utilize the cloud-based services.

System for Providing Network Security

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 6:
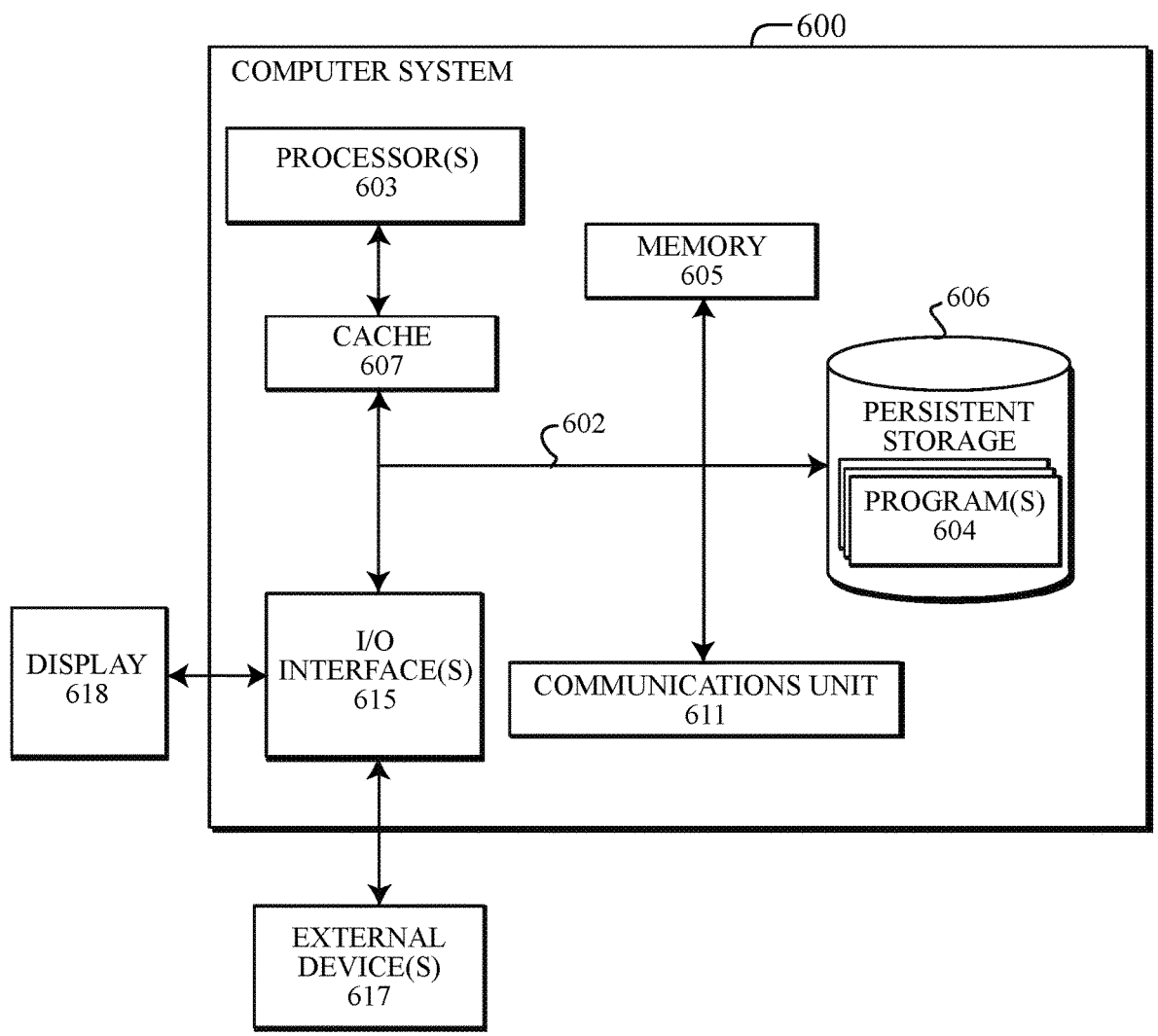
FIG. 6 depicts an embodiment of a block diagram of internal and external components of a computer system in accordance with the embodiments of the present disclosure.

Referring to the drawings, FIGS. 1a-3 depict diagrams of a computing environment 100, 190, 200 securing network communications between one or more network computer systems 111 and a network 150 in accordance with the embodiments of the present disclosure. Embodiments of computing environment 100, 190, 200 may include network devices interconnected with network 150 via network hardware 120 (such as one or more hubs, switches, modems, routers, repeaters, bridges, gateways, network cards, wireless access points, firewalls, etc.), including the interconnection of one or more network computer system 111 and network security device 101. Embodiments of the security device 101, network computer system 111, and network hardware 120 not only may comprise the elements of the systems and devices depicted in FIGS. 1a-3, but also may incorporate one or more elements of a computer system 600, as shown in FIG. 6 and described in the COMPUTER SYSTEM section below. One or more elements of the computer system 600 may be integrated into the security device 101, network computer system 111 and network hardware 120 of the computing environment 100, 190, 200, including (but not limited to) the integration of one or more processor(s) 603, program(s) 604, memory 605, persistent storage 606, cache 607, communications unit 611, input/output (I/O) interface(s) 615, external device(s) 617 and human-readable display 618.

Embodiments of the network computer system 111 and other network connected devices may operate as desktop computers, laptop computers, tablet computers, smartphones, servers, network nodes, wearable accessories such as smart watches, smart glasses, internet-of-things (IoT) devices, sensor devices or any other computer system known in the art. In some embodiments of the computing environments 100, 190, 200 one or more network computer systems (i.e. network computer systems 111a-111n, hereinafter referred to generally as "network computer systems 111", wherein the $n^{th}$ network computer system indicates the last network computer system 111 in a plurality thereof) and other network connected devices may represent computer systems utilizing clustered computers and components to act as a single pool of seamless resources when accessed through network 150. For example, such embodiments may be used in data center, cloud computing, storage area network (SAN), and network attached storage (NAS) applications.

Embodiments of the network computer systems 111 and other network connected devices may be placed into communication with one another over the network 150. Embodiments of the network 150 may be constructed using wired, wireless or fiber optic connections. Embodiments of the network computer systems 111 may connect and communicate over the network 150 via a communications unit 611, such as a network interface controller, network interface card or other network communication device capable of facilitating a connection to the network 150 or communicate with one or more network hardware 120 devices or systems. Embodiments of the communications unit 611 may implement specialized electronic circuitry allowing for communication using a specific physical layer and a data link layer standard. For example, Ethernet, Fiber channel, Wi-Fi or Token Ring to transmit data between the network computer system 111 and the network hardware 120 facilitating transmission and receipt of the data over network 150. In some embodiments, network computer system 111 may be equipped with one or more ports 109a for facilitating the transmission and receipt of the data from the network (referred to herein as network traffic). For example, port 109a may be an ethernet port, USB port, firewire port, thunderbird port, HDMI port, or any other port 109a that is capable of sending and receiving the transmission of data.

Communications unit 611 may further allow for a full network protocol stack, enabling communication over network 150 to the group of network computer systems 111 or other network devices linked together through communication channels. For example, security device 101 (described in detail below) acting as an intermediary communication device between the network computer system 111 and the network hardware 120 of the network 150. Network 150 may facilitate communication and resource sharing among the network computer systems 111 and other network accessible systems or devices connected to the network 150 (for example, network accessible storage media). Examples of network 150 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Cloud computing networks are a model of service delivery for enabling convenient, on-demand network 150 access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network 150 and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 200 is service oriented with a focus on statelessness, low coupling, modularity, and semantic interoperability. At the heart of cloud computing is an infrastructure that includes a network 150 of interconnected nodes 310.

Figure 2:
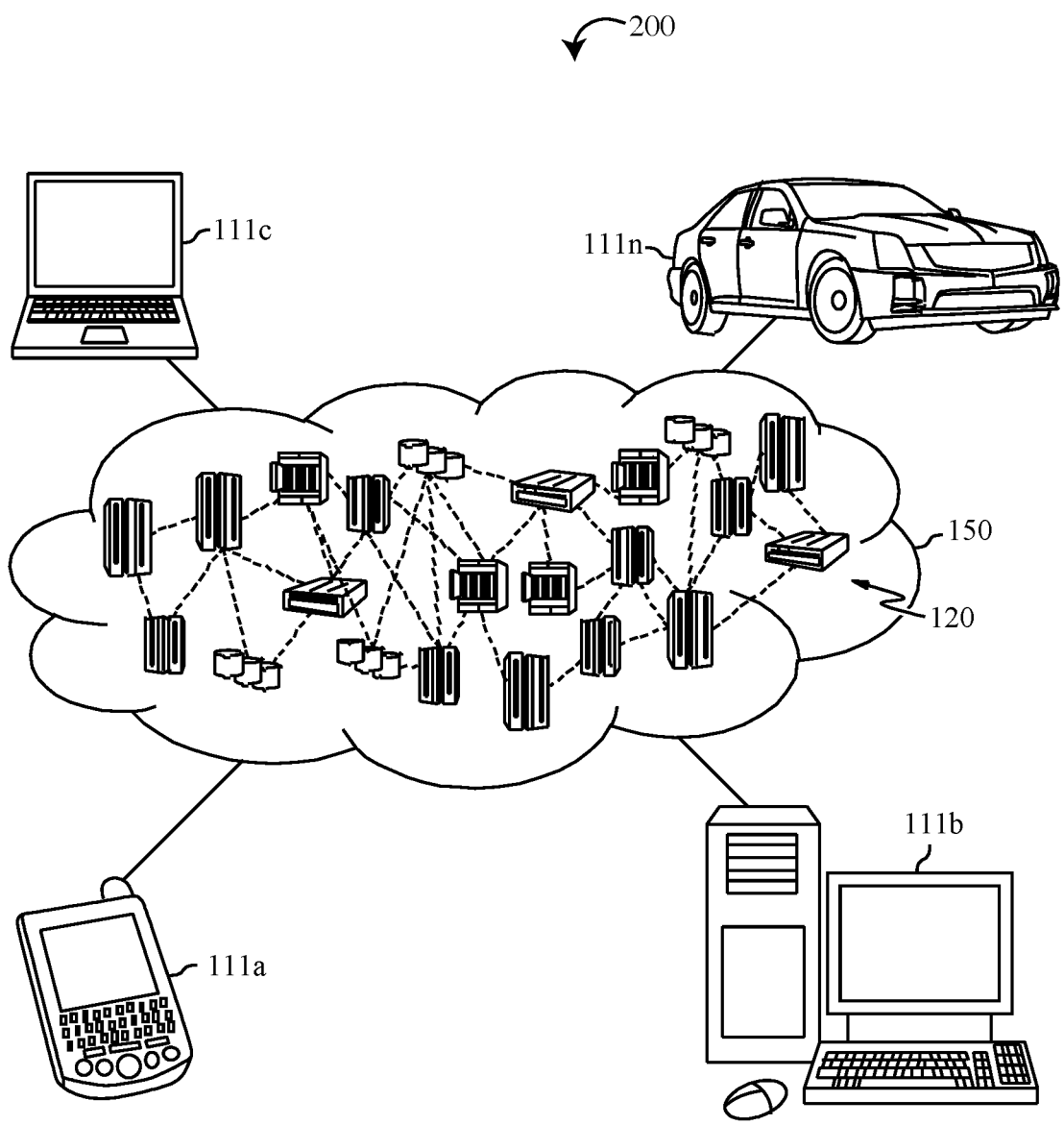
FIG. 2 depicts an embodiment of a cloud computing environment in accordance with the present disclosure.

Referring to the drawings, FIG. 2 is an illustrative example of a cloud computing environment 200. As shown, cloud computing environment 200 includes one or more cloud computing nodes with which network hardware 120 and local network computing systems 111 are used by cloud consumers, via network computer systems 111 operated by the cloud consumers, for example a personal digital assistant (PDA) or cellular telephone 111a, desktop computer, laptop computer 111c and/or non-conventional computer systems and IOT devices 111n. Nodes may communicate with one another and may be grouped (not shown) physically or virtually, in one or more networks 150, such as Private, Community, Public, or Hybrid clouds as described hereinabove, or a combination thereof. This may allow the cloud computing environment 200 to offer infrastructure, platforms and/or software as services for which a cloud consumer does not need to maintain resources on a local network computing system 111. It is understood that the types of local network computer systems 111 connected to the cloud computing environment 200, are intended to be illustrative only and that computing nodes and cloud computing environment 200 can communicate with any type of computerized device over any type of network 150 and/or network addressable connection (e.g., using a web browser).

Figure 3:
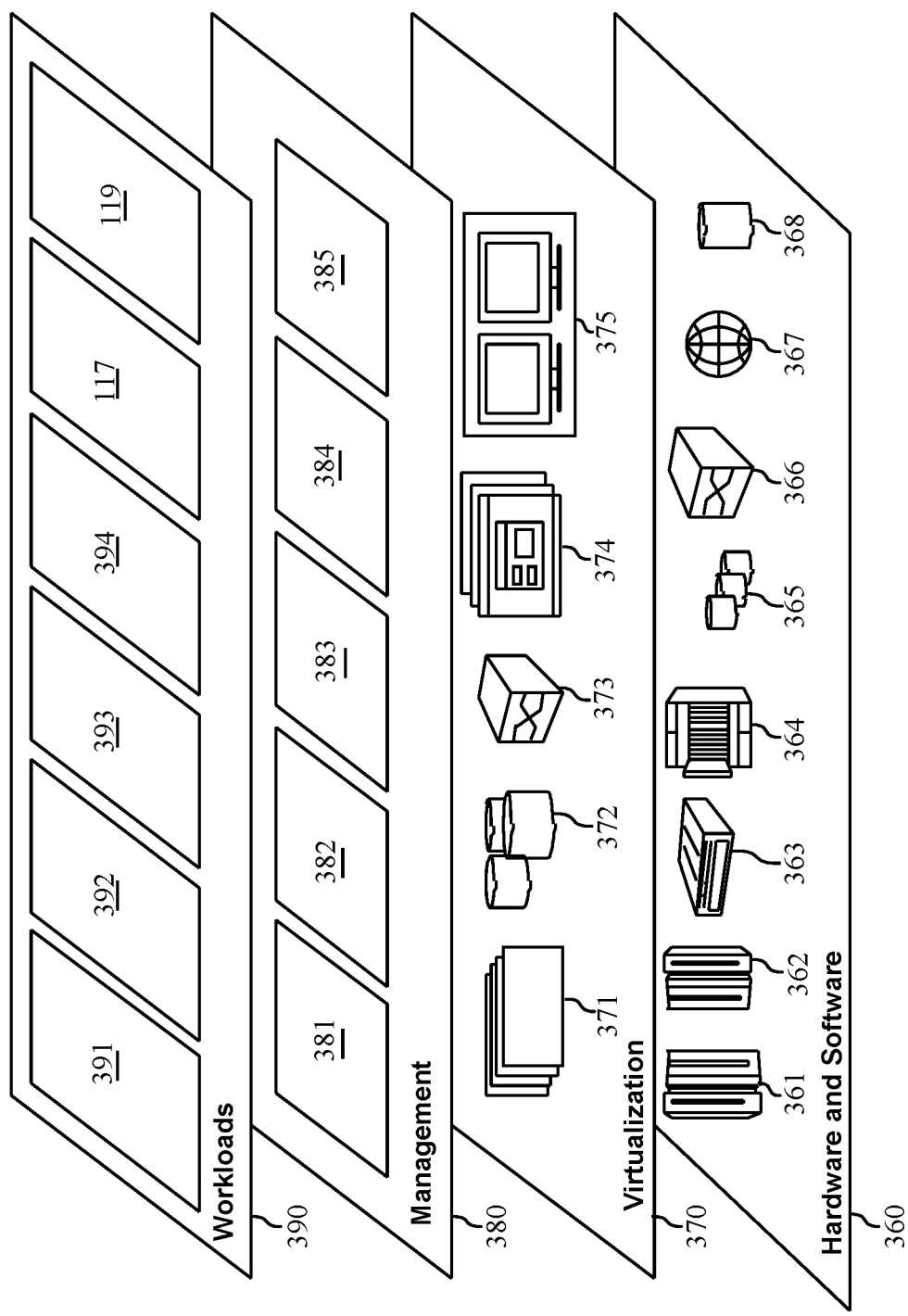
FIG. 3 depicts an embodiment of abstraction model layers of a cloud computing environment in accordance with the present disclosure.

Referring now to FIG. 3, a set of functional abstraction layers provided by cloud computing environment 200 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment 200. Metering and pricing 382 provide cost tracking as resources are utilized within the cloud computing environment 200, and billing or invoicing for consumption of these resources. In one example, these resources can include application software licenses. Security provides identity verification for cloud consumers and tasks, as well as protection for data and other resources. User portal 383 provides access to the cloud computing environment 200 for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391, software development and lifecycle management 392, virtual classroom education delivery 393, data analytics processing 394, threat knowledge base 117 and correlation engine 119.

Embodiments of the computing environments 100, 190, 200 described herein may include a security device 101. Embodiments of the security device 101 may be a specialized computer system or device comprising specialized configurations of hardware, software or a combination thereof, as shown and described in FIGS. 1a-1b of the present disclosure and in the embodiments described herein. Embodiments of the security device 101 may include a plurality of features for monitoring and controlling the flow of network traffic between the network hardware 120 of the network 150 and the network computer system 111 intended to receive the data of the network traffic. Embodiments of the security device 101 may be connected inline between one or more pieces of network hardware 120 and the network computer system 111. In the exemplary embodiment, the security device 101 may be wired or wirelessly connected to a first port 109a of a network computer system 111 and a second port 109b of the network hardware 120. For instance, by physically plugging the security device into ports 109a and 109b. For example, ports 109a, 109b may be ethernet ports facilitating the flow of network traffic from a modem, router, switch, hub, gateway, etc. connecting network 150 to the network computer system 111 using a wired connection. Instead of a direct connection using an ethernet cable to connect port 109a directly to port 109b, a first ethernet cable connects port 109b from the network hardware 120 to the security device 101 and a second ethernet cable connects the security device 101 to port 109a of the network computer system 111.

Embodiments of the security device 101 may regulate the flow of network traffic in a unidirectional or bidirectional manner. Embodiments of the security device 101 enabling unidirectional monitoring and/or flow of network traffic data in one direction, may implement traffic monitoring of the data and allow data to pass from either the network hardware 120 to the network computer system 111 or from the network computer system 111 to the network hardware 120. In some embodiments, the monitoring and/or flow of network traffic data may be permitted to pass through the security device 101 bidirectionally from network hardware 120 to the network computer system 111 and from the network computer system 111 to the network hardware 120. In some embodiments, the OOB management network 113 may be able to remotely switch the allowable directionality of the network traffic flow through the security device 101 from unidirectional to bidirectional or from bidirectional to unidirectional as needed or desired for maintaining security of the network 150 and the connected network computer systems 111. The switching of the directionality through the security device 101 may be automated in some embodiments or manually performed by users or administrators who may have access to the OOB management network 113.

Embodiments of the security device 101 may further comprise one or more modules specializing in performing one or more specific tasks or functions of the security device 101. The term "module" may refer to a hardware module, software module, or a module may be a combination of hardware and software resources. Embodiments of hardware-based modules may include self-contained components such as chipsets, specialized circuitry, one or more memory 605 devices and/or persistent storage 606. A software-based module may be part of a program 604, program code or linked to program code containing specific programmed instructions loaded into a memory 605 device or persistent storage 606 device of the security device 101 operating in computing environment 100, 190, 200, as exemplified in the drawings or the embodiments described herein. In the exemplary embodiment, security device 101 may comprise multiple hardware and/or software modules, including (but not limited to) onboard analytics 103, buffer 105 and/or gate 107.

Embodiments of the security device 101 may comprise an onboard analytics 103 module. The module comprising onboard analytics 103 for the security device 101 may provide basic analysis of the network traffic entering the security device 101 for potential threats using an onboard analytics 103 engine. Embodiments of the onboard analytics 103 module may be constructed as specialized hardware component specifically for the application of threat detection and controlling the network traffic through the security device 101, including disconnection of the network computer system 111 from the network 150 as needed to prevent threats from infiltrating or harming network computer system 111, network hardware 120 and/or remaining devices and systems of network 150. In some embodiments, the onboard analytics 103 module may be incorporated into a security device 101 as part of an application-specific integrated circuit (ASIC) comprising microchips designed specifically to perform analytics functions, basic threat analysis and transmission of metadata or compressed data of potential threats to cloud-based analytics 115, when advanced analytics or further analysis may be necessary by the onboard analytics 103. In alternative embodiments, the security device 101 may be designed as a general integrated circuit comprising onboard processor(s) 603, memory 605, persistent storage 606 and program(s) 604 containing programmable instructions for performing the onboard analytics 103 tasks, including analysis of potential threats and transmission requests for advanced analytics support from cloud-based analytics 115 services.

Embodiments of onboard analytics 103 may analyze and detect potential threats travelling as data or data packets through the network 150 as a part of the network traffic. Onboard analytics 103 may incorporate the use of mathematics, statistics, predictive modeling and machine learning techniques to recognize and learn the patterns of the network traffic passing through the security device 101 over time, to identify anomalies in the network traffic that may indicate a probability of a potential threat. Embodiments of machine learning techniques that may be implemented to teach the onboard analytics 103 to recognize potentially harmful threats within the network traffic, may be learned using supervised learning, unsupervised learning and/or semi supervised learning techniques. Supervised learning is a type of machine learning that may use one or more computer algorithms to train the onboard analytics 103 engine to detect anomalies and threats using labeled examples during a training phase. The term labeled example, may refer to the fact that during the training phase, there may be a desired input that will produce a known desired output by the onboard analytics 103 engine. The algorithm of the onboard analytics 103 may be trained by receiving a set of inputs along with the corresponding correct outputs. To employ supervised learning, the onboard analytics 103 may store a labeled dataset for learning, a dataset for testing and a final dataset which the onboard analytics 103 may use for making suggestions or predictions about the network traffic being analyzed for anomalies and threats.

The machine learning algorithms of the onboard analytics 103 may learn threat patterns by comparing actual output of the onboard analytics 103 with the correct outputs of the training data in order to find errors. The onboard analytics 103 may modify the model of data according to the correct outputs to refine the decision making of the onboard analytics 103, improving the accuracy of the automated decision making of the onboard analytics 103 to provide the correct inputs for basic threat detection and output an accurate threat level assessment of the network traffic. During the training phase, the onboard analytics 103 may learn the correct outputs by analyzing and describing well known data and information, that may be stored or cached by the security device 101. Examples of data modeling techniques that may be used by the onboard analytics 103 may include, but is not limited to, classification, regression, prediction and gradient boosting.

Unsupervised learning techniques, on the other hand, may be used when there may be insufficient historical data available to compare current network traffic with a previous set of labeled network traffic data. Machine learning that is unsupervised may not be "told" the correct output, as occurs with supervised learning algorithms. Instead, during unsupervised learning, the algorithm may explore the data of the network traffic to find common properties and attributes between the data being explored. Embodiments of an unsupervised learning algorithm can identify common attributes between anomalies that may indicate a threat to the network 150 or network computer system 111, that are being received by the security device 101. Examples of unsupervised machine learning may include self-organizing maps, nearest-neighbor mapping, k-means clustering, and singular value decomposition.

Embodiments of onboard analytics 103 may also incorporate semi-supervised learning techniques in some instances. Semi-supervised learning may be used for the same applications as supervised learning. However, instead of using entirely labeled examples of network traffic data during the training phase, there may be a mix of labeled and unlabeled examples during the training phase. Semi-supervised learning may be ideal when there is a small or limited amount of labeled data being used as examples (i.e., a low amount of network traffic or known threats entering the security device 101) alongside a larger amount of unlabeled data that may be presented to the onboard analytics 103 during the training phase. Suitable types of machine learning techniques that may use semi-supervised learning may include classification, regression and prediction models.

In some embodiments of the security device 101, the patterns of anomalies and threats learned by the onboard analytics 103 may not solely be dependent upon network traffic entering a single security device 101. Rather, collective network traffic analysis for patterns of anomalies and threats may be shared across a network of security devices 101a-101n as shown and depicted in FIG. 1b. Machine learning by individual security devices 101, including the identification of threats to the network 150 and network computer systems 111 may be shared between the plurality of security devices 101 that form the network of security devices 101a-101n, improving the machine learning ability of onboard analytics 103 for the individual security devices 101 in the network of security devices 101a-101n to individually assess and recognize patterns of threats and anomalies. Sharing of network pattern recognition, anomaly detection and threat identification may result in an overall increased amount of analysis of network traffic, allowing for increased amounts of recognition of patterns depicting potential threats and an overall improvement to the analytics of individual security devices 101 to accurately identify a potential threat.

In alternative embodiments, the security device 101 may be a centralized device that may operate similar to a router and route data to multiple network computer systems 111a-111n, wherein network computer systems 111 may be connected (either wired or wirelessly) to one of a plurality of output ports of the security device 101, connected to gate 107 controlling the flow of network traffic to and from the connected network computer system 111. By positioning the security device 101 as a central location distributing the network traffic amongst each of the network computer systems 111a-111n, the security device 101 may analyze all traffic entering and exiting the security device 101 and dynamically learn the entire network traffic patterns of network 150 over time, rather than only learning from the network traffic patterns based on data flowing to one individual network computer system 111 or having to separately communicate with an entire network of security devices 101a-101n.

Embodiments of onboard analytics 103 module may determine and output a determination of a threat level indicating a level of risk associated with allowing the network traffic intercepted by the security device 101 to pass between the network computer system 111 and the network hardware 120 of network 150. Embodiments of the threat level may be depicted as a value, a percentage, and/or a probability, within a range of values, percentages or probabilities. For example, a threat level can be described as a value selected from 0 to 10 inclusively or 0% to 100% inclusively. Actions performed by the security device 101 may vary or be customized depending on the configuration of the security device 101 and/or one or more configurations and settings managed by the OOB management network 113. In some embodiments, the thresholds for the pre-set safe level may be dynamically set by the OOB management network 113 or the security device 101 using machine learning to identify and adjust the pre-set safe level to an optimal level of safety and risk, based on the network traffic patterns and determined levels of risk acceptable to the owners or administrators of the network 150. For example, through the learned behavior of the network owner or administrators previous settings and tolerance for allowing riskier network traffic to pass through the security device 101 or networks of security devices 101a-101n.

Embodiments of security device 101 may be programmed to perform a particular action based (at least in part) on the threat level determined by the onboard analytics 103. In some embodiments, the security device 101 may be programmed to passively allow network traffic to pass through the security device as a function of the threat level, as calculated by the onboard analytics 103, when the threat level is below a pre-set threshold considered to be safe or an acceptable level of risk by the network administrator, network owner, and/or enterprise. For example, a network administrator that is risk adverse can set the pre-set safe threshold level for the threat level to zero (0) via the OOB management network. In such an example, network traffic determined to be considered completely safe and bearing zero or only a negligible amount of risk, as determined by the onboard analytics 103, would be allowed to continue to pass through gate 107 and enter the network computer system 111 or pass from the network computer system 111 to the network hardware 120. In some embodiments, network administrators may be more willing to allow riskier levels of network traffic to continue to pass through the security device 101. For example, a network administrator can select a pre-set safe threshold for the threat level to be greater than zero, for instance, the threshold value may be set to 5%, 10%, 15%, 20%, etc., via the OOB management network 113, allowing for network traffic to continue to pass through the security unimpeded while the threat level is determined to be below the pre-set level.

In some embodiments of the security device 101, a separate action may be pre-set to disconnect the network connection when the onboard analytics 103 determines the threat level of the network traffic to have reached a maximum threat level and/or a maximum threat level range. For example, pre-setting via the OOB management network 113 an action to disconnect the computer systems 111 from the network hardware 120 by opening the gate 107 of the security device if the onboard analytics 103 determines the network traffic to be a risk that reaches a maximum threat level. For instance, if the threat level is measured as a value between 0 to 100%, if the threat level is determined to be 100%, the maximum threat level measured within the range, the gate 107 of the security device 101 is opened, creating an air gap between the first port 109a and the second port 109b, disconnecting the network connection and preventing network traffic from flowing between the network computer system 111, the network hardware 120 and/or the remaining systems of the network 150. In some embodiments, a network administrator, owner, enterprise, etc., may pre-set a maximum threat level range via the OOB management network 113. A maximum allowable level range may be a value or range of values wherein if the threat level determined by the onboard analytics 103 meets, exceeds or falls within the value or range of values, respectively, the security device 101 may open gate 107 and disconnect the network computer system 111 from network 150. For instance, a maximum threat level range wherein the threat level is a measured value between 0% to 100%, may be set a threat level range of 50-100%, 60-100%, 70-100%, 80-100%, 85-100%, 90-100% or 95-100%.

Embodiments of gate 107 of security device 101 may be any type of mechanical or logical device that may be capable of connecting or disconnecting the flow network traffic between the network hardware 120 and/or the network computer system 111 and more specifically, disrupting the network traffic between port 109a and port 109b by disconnecting the network connection. In some embodiments, the gate 107 could be a physical gate such as a mechanical switch to open or close a circuit or a layer-1, i.e. physical layer, switch of the network 150. In other embodiments, the gate 107 may be a layer-2, i.e., data-link layer, switch which may operate using a MAC address to determine a path for forwarding and transmitting frames within the network 150. In some embodiments, gate 107 may be a logical gate which may use a diode or transistor to act as an electronic switch. However, in some embodiments, the logic gate may be constructed using alternatives to the diode or transistor. For example, vacuum tubes, electromagnetic relays, pneumatic logic, optics and/or mechanical elements.

Embodiments of the gate 107 can be modulated between the open and closed position as a function of the determined threat levels for the network traffic entering the security device 101. As discussed above, the gate 107 can be maintained or modulated into a closed position when the threat level of the network traffic, analyzed by the onboard analytics, remains below a pre-set safe threat level threshold. In contrast, the gate 107 may be modulated from a closed position to an open position when onboard analytics 103 determine network traffic comprising a maximum threat level or within a maximum threat level range, effectively disconnecting the network connection. Instructions to modulate the gate 107 between the open or closed positions may be pre-programmed into an onboard microchip or as program instructions in a program 604 of the security device 101. In other embodiments, the instructions to open or close the gate 107 of the security device 101 may be managed and transmitted to the security device 101 from an 00B management network 113 communicating directly with the security device 101 outside of network 150, in order to separate the management plane of the security device 101 from the threats of a cyber-attack.

In some embodiments of the security device 101, advanced analytic assessments and decisions may be requested or obtained from a cloud-based analytics 115 service in situations wherein the onboard analytics 103 may not be entirely sufficient or accurate for evaluating potential threats of the network traffic. In the exemplary embodiment, a scenario where cloud-based analytics 115 services may be requested to perform advanced analytic analysis of the network traffic may occur when the onboard analytics 103 determines a threat level that exceeds the pre-set safe level, but the threat level is also less than the maximum threat level or maximum threat level range. For example, the threat level ranges from 0 to 100, with a safe pre-set threat level threshold set for threats less than 10, and a maximum threat level range of 90 to 100. In this example, a threat level determined to be higher than 10 but less than 90 could trigger the security device 101 to request advanced analytics from the cloud-based analytics 115 services because the assessed threat level by the onboard analytics 103 exceeds the pre-set safe level threshold but less than the maximum threat level range.

In some embodiments of security device 101, a security device 101 that deploys the use of advanced analytic analysis of the network traffic by the cloud-based analytics 115 service may prevent the network traffic from leaving the security device 101 by buffering the network traffic data using a buffer 105. Embodiments of buffer 105 may be a region of a physical memory 605 device that may be used to temporarily store the data of the network traffic while the security device 101 awaits a decision from the cloud-based analytics 115 regarding the potential threat of the network traffic's data. Embodiments of buffer 105 may be a fixed memory location in the memory 605 hardware or the buffer 105 may be a virtual data buffer of a software application that points to a physical location within the memory 605 of the security device 101. Embodiments of security device 101 may selectively extract portions of the network traffic data and submit the extracted data to the cloud-based analytics 115 for threat assessment, processing and correlation to known or existing threats. In the exemplary embodiments, security device 101 extracts metadata and/or compressed data of the network traffic stored by buffer 105 and transmits the metadata and/or compressed data to the cloud-based analytics 115 for an assessment of the threat posed by the network traffic.

Embodiments of cloud-based analytics 115 may provide advanced analytics support to one or more security devices 101 and/or one or more networks of security devices 101a-101n. The cloud-based analytics 115 may operate as part of a cloud computing environment 200 and provide one or more applications, programs and/or services remotely accessible to the security device 101 via a cloud service provider or tenant of a cloud service network. The cloud-based analytics 115 can be used to assess the threat of the network traffic by recognizing patterns of the network traffic data, in a manner similar to the onboard analytics 103. However, instead of a data set for recognizing patterns that may be limited to a particular security device 101 or network of security devices 101a-101n, the cloud-based analytics 115 may recognize the patterns of threats associated with historical network traffic data sampled globally across a plurality of networks 150, from each network requesting and utilizing the analytic services of the cloud-based analytics, including one or more networks that may be separate from the network 150 monitored by the security device 101 or network of security devices 101a-101n. In response to analyzing the network data transmitted by the security device 101 in view of the known patterns of threats, cloud-based analytics 115 can return a decision regarding the threat of the network traffic data and from the decision rendered by the cloud-based analytics 115, the security device 101 and/or the OOB management network 113 may modulate the gate 107 into the open or closed position, either disconnecting the network connection or releasing the network traffic data from buffer 105 and allowing network traffic to continue to pass through the security device 101.

Embodiments of the cloud-based analytics 115 may comprise a correlation engine 119. A correlation engine 119 may be a software application or workload of cloud-based analytics 115 that may be programmed to understand relationships between patterns of data intercepted as network traffic and the threats to the security of the network 150 and/or network computer systems 111 sending and/or receiving the network traffic data. Embodiments of the correlation engine 119 may aggregate, normalize and analyze the metadata and/or compressed data of the network traffic data using predictive analytics and/or fuzzy logic to draw a conclusion whether to instruct or alert the security device 101 and/or the OOB management network of a presence of a security threat. The correlation engine 119 may analyze the metadata and compressed data of the network traffic, including multiple network logs, log types, firewall activity, etc. and may query the data for known patterns and correlate security events to the known patterns to identify actionable security threats. For example, host-based activities that may indicate a compromised host, for instance from a virus, malware, spyware, trojan, ransomware, keystroke logger, etc.

In some embodiments, the correlation engine 119 may detect and identify suspicious network traffic patterns or sequences of events that may indicate a malicious threat using a threat knowledge base 117. The threat knowledge base 117 may comprise records maintaining samples of data identifying and describing dynamic patterns of malicious activity using a library of known malicious threats, including samples of viruses, malware, spyware, trojans, ransomware, etc. The correlation engine 119 may match the behavior of known threats cataloged in the threat knowledge base 117 or another repository of known threats and identify matching patterns of behavior in the network data or metadata indicating the presence of a known threat. Upon identifying a matching threat based on the network traffic data and metadata and the samples of threats known and stored by the threat knowledge base 117, the cloud-based analytics 115 can alert the security device 101 and/or 00B management network 113, where appropriate action to modulate the gate 107 of the security device 101 into the open or closed position may be performed based on the presence of an identified threat or lack thereof. Moreover, the threat knowledge base 117 may log the events of the analysis, the pattern identified in the network traffic data and/or metadata, indicating the presence of the particular threat identified and any other additional information that may be used for further teaching the correlation engine 119 to accurately identify the malicious threat that may be experienced by other networks 150 using the cloud-based analytics 115 services. Further teaching and improving the ability of the cloud-based analytics 115 to accurately detect and identify threats in the data traffic of networks 150.

Method for Providing Network Security

Figure 4:
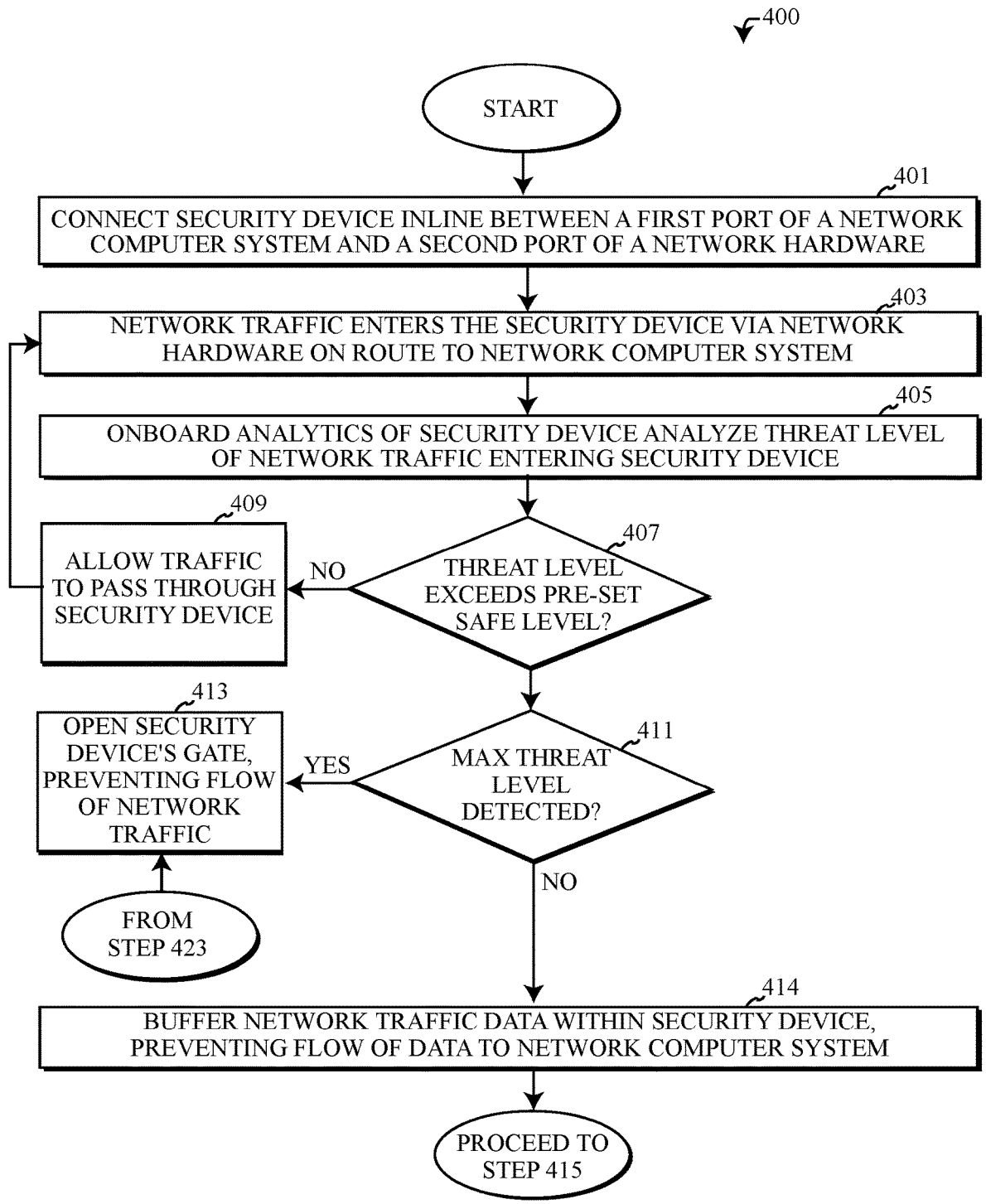
FIG. 4 depicts an embodiment of an algorithm implementing a computerized method for providing network security for a computer network.
Figure 5:
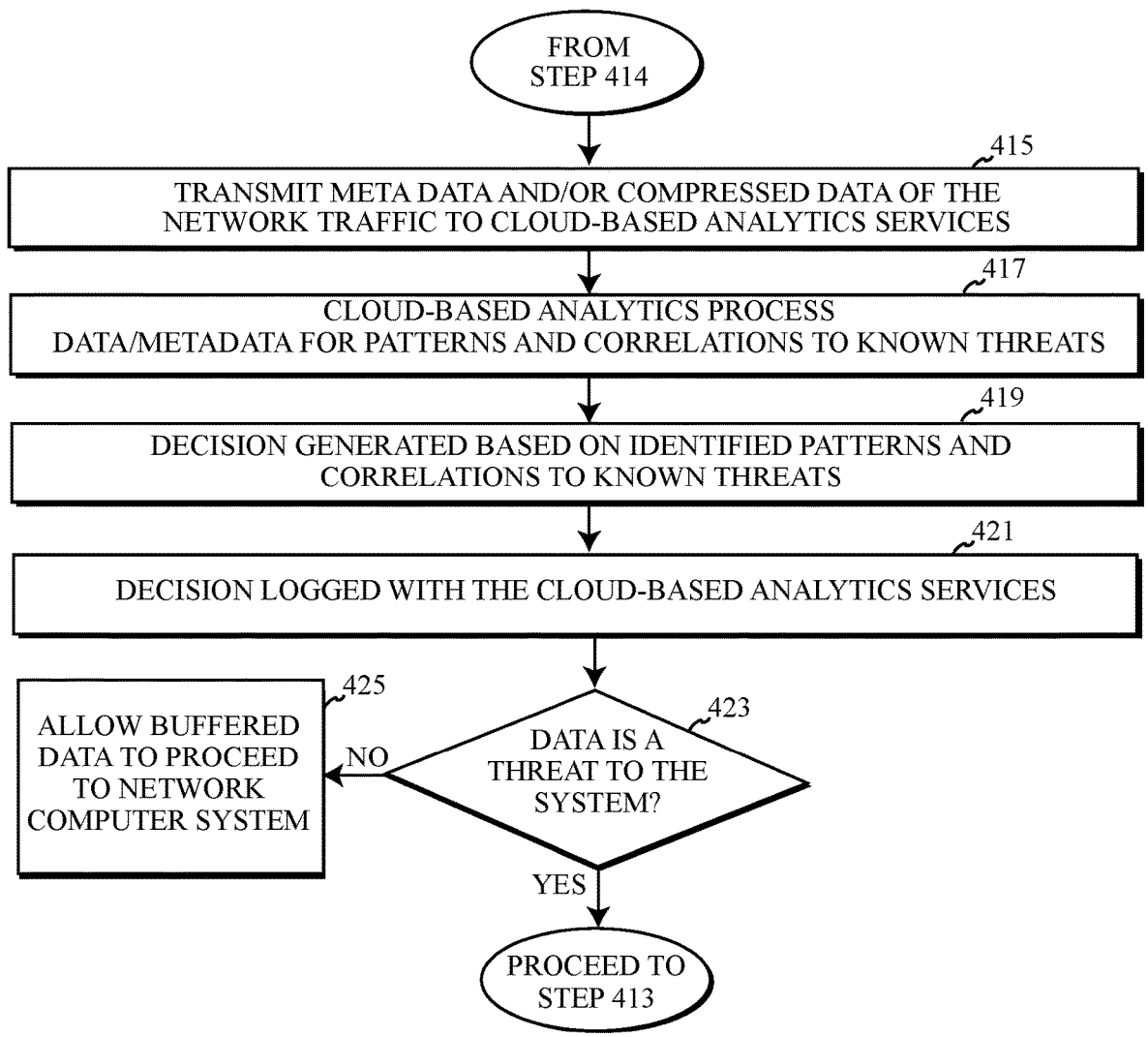
FIG. 5 is a continuation of the embodiment of the computerized method for providing network security depicted in FIG. 4

The drawings of FIGS. 4-5 represent an embodiment of an algorithm 400 performing a computer-implemented method for providing network security, as described by FIGS. 1a-3 using one or more computer systems defined generically by computer system 600 of FIG. 6 below and more specifically by the embodiments of specialized computer systems depicted in FIGS. 1a-3 as described herein. A person of ordinary skill in the art should recognize that the steps of the method described in FIGS. 4-5 may be performed in a different order than presented. The algorithm 400 may not necessarily require all the steps described herein to be performed. Rather, some embodiments of algorithm 400 may alter the methods by performing a subset of steps using one or more of the steps discussed below.

Embodiments of the algorithm 400 may begin at step 401. In step 401, a security device 101 may be connected inline between a network computer system 111 and network hardware 120 of a computer network 150. The security device 101 may connect to one or more input/output ports 109*a*, 109*b* that may be open and/or available for receiving a connection from the security device 101 on both the network computer system 111 and/or the network hardware 120. In the exemplary embodiment, the security device may connect to a first port 109*a* of the network computer system 111 and a second port 109*b* of the network hardware 120. For example, the security device 101 may connect to an open ethernet port, USB port, firewire port, thunderbird port, HDMI or other types of ports 109 that may be equipped to carry network traffic and data packets from the network 150 to the network computer system 111.

In step 403 of algorithm 400, network traffic from network 150 may enter the security device 101 by way of the network hardware 120 facilitating the flow of network traffic en route to the network computer systems 111. Network traffic entering the security device in step 403 may be further analyzed in step 405 for anomalies or threats to the network computer system 111 that may be present. In step 405, onboard analytics 103 of the security device 101 perform a first level of analysis on the network traffic entering the security device 101 for anomalies and threats. The onboard analytics 103 may perform basic analytic analysis of the network traffic and assign a threat level to the network traffic based on the similarity of the network traffic and anomalies that may be present within the network traffic, compared to known threats such as viruses, exploits, trojans, malware, ransomware, etc. and threats or anomalies that may be recognized or learned based on the patterns of network traffic over time passing through the security device 101.

Figure 1B:
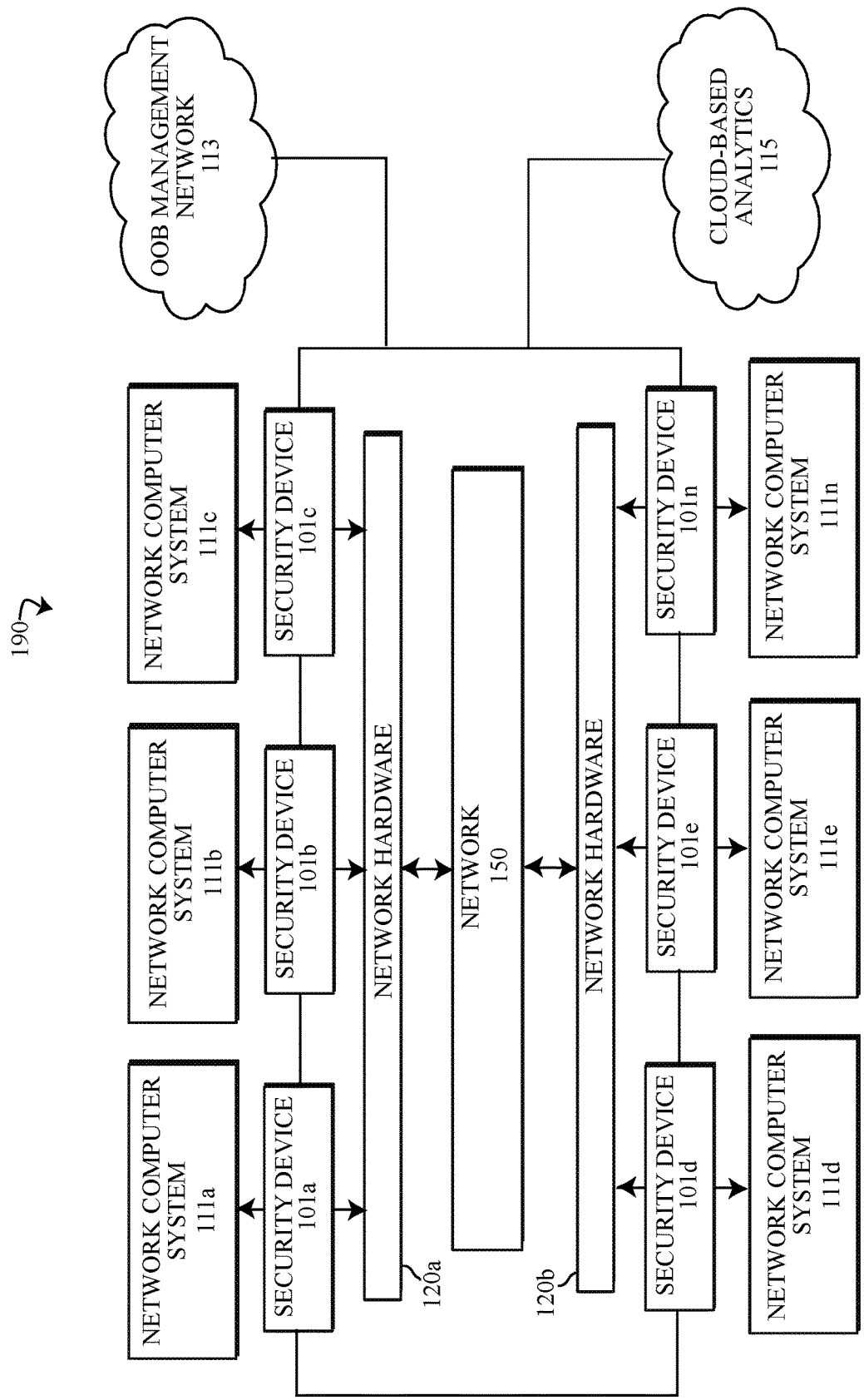
FIG. 1b depicts a functional block diagram describing an alternative embodiment of a computing environment comprising one or more in-line network security devices placed in communication with one another in accordance with the present disclosure.

In some embodiments, such as the exemplary embodiment of FIG. 1*b*, the recognition of threats and anomalies in the network traffic based on patterns of network traffic passing through the security device 101 over time, may incorporate patterns of network traffic and patterns identified from a plurality of network security devices 101*a*-101*n*. The plurality of security devices 101*a*-101*n* may share onboard analytics 103 data amongst the network of security devices 101*a*-101*n* improving the overall threat detection capabilities and accuracy of the onboard analytics 103 by using the patterns of recognized threats across the multiple security devices 101*a*-101*n* over time, rather than only using the learned patterns learned by a single security device 101. Embodiments of the onboard analytics 103 may assign a threat level to the network traffic, which may be represented by a value or a range of values. For example, in the exemplary embodiment, the threat level assigned by the onboard analytics 103 may be within a range of values between 0 to 100.

In step 407 of algorithm 400, a determination is made by the security device 101 directed toward how to handle the network traffic entering the security device 101, based on the analysis of the onboard analytics 103 in step 405. Based on the threat level assigned by the onboard analytics 103 as a result of the analysis of the network traffic in step 405, the security device 101 compares the threat level assigned by onboard analytics 103 to a pre-set threshold level determined to be safe, a low level of risk, or an acceptable level of risk by the OOB management network 113. For example, in an exemplary embodiment of the threat level range between 0-100 as described above, the OOB management network 113 may set the threshold level to 0, indicating that the OOB management network 113 may passively allow network traffic to pass through gate 107 to the network computer system 111 that is determined not to be a threat or risk of threat and thus assigned a threat level of zero. In some embodiments, the OOB management network 113 may increase the threat level to be considered safe or a safe level of acceptable risk. For example, in some embodiments, the pre-set safe level may be 10 or less, 20 or less, 30 or less, etc., on a scale of 0 to 100.

In step 407, if the determination is made that the threat level assigned by the onboard analytics 103 of the security device 101 does not exceed the pre-set safe level designated or assigned by the OOB management network 113, the algorithm 400 may proceed to step 409. In step 409, the OOB management network 113 may maintain the gate 107 of the security device 101 in the closed position, allowing for network traffic entering the security device from the port 109*b* of the network hardware 120 to passively pass through the security device 101 and enter the port 109*a* of the network computer system 111.

Conversely, if in step 407, a determination is made by the onboard analytics 103 that the threat level of the network traffic entering the security device 101 exceeds the pre-set safe level established by the OOB management network 113, the algorithm 400 may proceed from step 407 to step 411. In step 411, the algorithm 400 may make an additional determination whether the threat level of the network traffic analyzed by the onboard analytics 103 in step 405 meets or exceeds a maximum threat level established by the OOB management network 113. The maximum threat level may be defined as either the maximum threat level value within the range of threat levels established by the OOB management network 113, or a maximum threat level threshold wherein once met or exceeded, the security device will terminate the connection between the network 150 and network computer system 111. For example, in some embodiments, a maximum threat level may be detected in a range of threat levels between 0 to 100, when the threat level detected by the onboard analytics 103 is 100. In other embodiments, with a threat level range of 0 to 100, the OOB management network 113 may assign a maximum threat level of acceptable risk to 89 and once a threat level of 90 to 100 is detected, the maximum threat level is determined to be met and a response per algorithm 400 occurs accordingly. If the maximum threat level is detected based on the analysis of the onboard analytics 103, the algorithm 400 may proceed to step 413, wherein the gate 107 of the security device 101 is placed in the open position, preventing the flow of network traffic from the network 150 to the network computer system 111. Effectively creating an air gap between the first port 109*a* of the network computer system and the second port 109*b* of network hardware 120, disconnecting the network computer system 111 from the network 150.

Conversely, if in step 411 a maximum threat level is not determined by the onboard analytics, but the threat level exceeds the pre-set safe level as determined in step 407, the algorithm 400 may proceed to step 414. In step 414, the data of the network traffic is buffered using buffer 105 to prevent the network traffic from leaving the security device 101 during the interim period of time wherein the security device 101 consults cloud-based analytics 115 for a decision how to handle the network traffic attempting to enter the network computer system 111 comprising data perceived to comprise a level of threat exceeding the pre-set safe level. In step 415 of algorithm 400, the security device 101 may transmit metadata and/or compressed data of the network traffic stored in the buffer 105 of the security device to a cloud-based analytics service such as the cloud-based analytics 115 depicted in the exemplary embodiment of FIG. 1*a* and FIG.

1b, for further analysis of the network traffic anomalies or threat, processing and decisions for handling the network traffic.

In step 417 of algorithm 400, the cloud-based analytics 115 processes the metadata and compressed data selectively provided by the security device 101 to the cloud-based analytics 115. A correlation engine 119 analyses the network traffic and anomalies of the network traffic for patterns and correlations to known threats and threats experienced by other networks communicating with the cloud-based analytics 115. In some embodiments, a threat knowledge base 117 may compile records of known threats, patterns indicating the presence of the known threats and industry procedures for mitigating, avoiding or removing the known threat. In step 419, based on the detection of a known pattern or correlation to a known threat based on the metadata and/or compressed data provided to the cloud-based analytics 115, a decision may be generated by the cloud-based analytics 115 describing how the security device 101 should respond to the potential threat entering the security device 101 with the network traffic.

The decision generated in step 419 may be logged with the cloud-based analytics 115 in step 421 of the algorithm 400. In the exemplary embodiment, the decision is logged within the records of the threat knowledge base 117. The records of the threat knowledge base 117 may detail the type of detected threat, the patterns identified correlating the metadata and/or compressed data received to the presence of the threat and one or more recommended actions for the mitigation, removal and/or prevention of the threat harming the network computer system 111, the network hardware 120 and/or the network 150 generally. The log of the threat and the decision for handling the threat may allow for the continual knowledge and updating of the cloud-based analytics 115 decision-making and improvement of the correlation engine 119 to continue to accurately detect and provide accurate decision-making for other networks that may also utilize the cloud-based analytics, including one or more enterprise networks.

In step 423 the algorithm 400 performs a determination of how to manage the network traffic data being stored within the buffer 105 based on the decision received from the cloud-based analytics 115. If the decision from the cloud-based analytics 115 indicates that the network traffic data being stored by the buffer 105 does not comprise a threat to the network computer system 111 intended to receive the network traffic data, the algorithm 400 may proceed to step 425 and allow the buffered data to proceed across the gate 107 of the security device 101 and enter the network computer system 111. Conversely, if the determination by the cloud-based analytics 115 indicates to the security device 101 and/or the OOB management network 113 that the data buffered within the security device 101 comprises a threat to the network computer system 111, the algorithm 400 may proceed to step 413, wherein the OOB management network 113 and/or the security device 101 may open the security device's 101 gate 107, creating an air gap between the network hardware 120 and the network computer system 111, preventing the flow of network traffic and buffered data to the network computer system 111.

Computer System

FIG. 6 illustrates a block diagram of internal and external components depicting an embodiment of a computer system 600, which may be representative of the one or more computer systems depicted in the computing environment 100, 190 as shown in FIGS. 1a-3, in accordance with the embodiments of the present disclosure. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, security device 101, server computer systems, network hardware 120, network computer systems 111, network terminals, thin clients, thick clients, kiosks, client devices, laptop computer systems, tablet computer systems, cellular telephones (e.g., smart phones), multiprocessor systems, microprocessor-based systems, network PCs, minicomputer systems, mainframe computer systems, IOT devices, sensor devices and distributed cloud computing environments that include any of the above systems or devices or additional computing devices or systems known or used by a person skilled in the art.

Computer system 600 may include communications fabric 602, which provides for communications between one or more processors 603, memory 605, persistent storage 606, communications unit 611, and one or more input/output (I/O) interface(s) 615. Communications fabric 602 can be implemented with any architecture designed for passing data and/or controlling information between processors 603 (such as microprocessors, communications and network processors, etc.), memory 605, external devices 617, and any other hardware components within a system. For example, communications fabric 602 can be implemented with one or more buses.

Memory 605 and persistent storage 606 may be computer-readable storage media. Embodiments of memory 605 may include random access memory (RAM) and cache 607 memory. In general, memory 605 can include any suitable volatile or non-volatile computer-readable storage media and may comprise firmware or other software programmed into the memory 605. Software applications, program(s) 604 and services may be stored in persistent storage 606 for execution and/or access by one or more of the respective processors 603 of the computer system 600.

Persistent storage 606 may include, for example, a plurality of magnetic hard disk drives. Alternatively, or in addition to magnetic hard disk drives, persistent storage 606 can include one or more solid state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 606 can also be removable. For example, a removable hard drive can be used for persistent storage 606. Other examples include optical and magnetic disks, thumb drives, and smart cards that are inserted into a drive for transfer onto another computer-readable storage medium that is also part of persistent storage 606.

Communications unit 611 provides for communications with other computer systems or devices via a network 150. In the exemplary embodiment, communications unit 611 may include network adapters or interfaces such as a TCP/IP adapter cards, wireless Wi-Fi interface cards, 3G, 4G, or 5G wireless interface cards or other wired or wireless communication links. The communication network 150 can comprise, for example, copper wires, optical fibers, wireless transmission, routers, firewalls, switches, gateway computers, edge servers and/or other network hardware 120 which may be part of or connect nodes of the network 150 to end user devices, client devices, terminals or other network computer systems 111. Software and data used to practice embodiments of the present invention can be downloaded to each of the computer systems operating in computing environment 100, 190 or computer system 600 through communications unit 611 (e.g., via the Internet, a local area network or other wide area network). From communications unit 611, the software and data can be loaded onto persistent storage 606.

One or more I/O interfaces 615 may allow for input and output of data with other devices that may be connected to computer system 600. For example, I/O interface 615 can provide a connection to one or more external devices 617 such as one or more internet-of-things devices, recording devices such as an audio system, camera systems, one or more sensor device(s), input devices such as a keyboard, computer mouse, touch screen, virtual keyboard, touch pad, pointing device, or other human interface devices. External devices 617 can also include portable computer-readable storage media such as, for example, thumb drives, portable optical or magnetic disks, and memory cards. I/O interface 615 may connect to human-readable display 618. Human-readable display 618 provides a mechanism to display data to a user and can be, for example, a computer monitor or screen. Human-readable display 618 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   connecting a security device inline between a first port placed in communication with a network computer system and a second port placed in communication with network hardware of a computer network;
   intercepting, by the security device, network traffic of the computer network flowing from the network hardware to the network computer system;
   analyzing the network traffic intercepted by the security device for a threat level of the network traffic exceeding a pre-set safe level;
   modulating a gate of the security device as a function of the threat level, wherein opening the gate in response to security threat creates an air gap preventing network traffic from passing from the second port through the security device to the first port in communication with the network computer system;
   determining, by the security device, that the threat level of the network traffic exceeds the pre-set safe level;
   further determining, by the security device, that the threat level of the network traffic is less than a maximum threat level or maximum threat level range set by the security device;
   buffering the network traffic received by the security device in an on-board buffer, preventing the network traffic from entering the network computer system; and
   in response to said buffering, opening or closing the gate.

2. The computer-implemented method of claim 1, further comprising:
   determining, by the security device, that the threat level of the network traffic meets or is below the pre-set safe level; and
   modulating the gate of the security device to a closed position, allowing the network traffic to pass from the second port through the security device to the first port in communication with the network computer system.

3. The computer-implemented method of claim 1, further comprising:
   determining, by the security device, that the threat level of the network traffic exceeds the pre-set safe level;
   further determining, by the security device, that the threat level of the network traffic meets or exceeds a maximum threat level or a maximum threat level range set by the security device; and
   in response to determining the threat level meets or exceeds the maximum threat level or the maximum threat level range set by the security device, modulating the gate of the security device to an open position, creating an air gap between the first port and the second port, preventing the network traffic from passing through the security device to the network computer system.

4. The computer-implemented method of claim 1, said method further comprising:
   prior to said opening or closing the gate,
      transmitting metadata or compressed data of the network traffic to cloud-based analytics determining a correlation between a threat posed by the network traffic and known threats to computer systems; and
      receiving from the cloud-based analytics, a decision to modulate the gate of the security device into an open or closed position as a function of the correlation between the threat posed by the network traffic and the known threats to the computer systems, wherein opening the gate creates an air gap between the second port and the first port, preventing the network traffic from passing from the network hardware through the security device and to the network computer system and closing the gate releases the network traffic from the buffer, allowing the network traffic to pass through the security device and to the network computer system.

5. The computer-implemented method of claim 1, wherein the security device is part of a network of security devices comprising a plurality of security devices analyzing the network traffic intercepted by each security device within the network of security devices for threat levels exceeding the pre-set safe level, and the analysis of the network traffic performed by each security device within the network of security devices is shared amongst the network of security devices.

6. The computer-implemented method of claim 1, wherein the security device is a pluggable dongle, and the gate is a physical gate or logical gate.

7. The computer-implemented method of claim 1, wherein the step of modulating the gate of the security device as a function of the threat level is managed by an out-of-band management network connected to the security device.

8. A computer system comprising:
   a security device connected inline between a first port placed in communication with a network computer system and a second port placed in communication with network hardware of a computer network;

at least one processor placed in electronic communication with the security device; and a computer-readable storage media coupled to the at least one processor, wherein the computer-readable storage media contains program instructions executing a computer-implemented method comprising:

intercepting, by the security device, network traffic of the computer network flowing from the network hardware to the network computer system, analyzing the network traffic intercepted by the security device for a threat level exceeding a pre-set safe level, modulating a gate of the security device as a function of the threat level, wherein opening the gate in response to security threat creates an air gap preventing network traffic from passing from the second port through the security device to the first port in communication with the network computer system;

determining, by the security device, that the threat level of the network traffic exceeds the pre-set safe level;

further determining, by the security device, that the threat level of the network traffic is less than a maximum threat level or maximum threat level range set by the security device;

buffering the network traffic received by the security device in an on-board buffer, preventing the network traffic from entering the network computer system; and in response to said buffering, opening or closing the gate.

9. The computer system of claim 8, further comprising:
determining, by the security device, that the threat level of the network traffic meets or is below the pre-set safe level; and modulating the gate of the security device to a closed position, allowing the network traffic to pass from the second port through the security device to the first port in communication with the network computer system.

10. The computer system of claim 8, further comprising:
determining, by the security device, that the threat level of the network traffic exceeds the pre-set safe level;
further determining, by the security device, that the threat level of the network traffic meets or exceeds a maximum threat level or maximum threat level range set by the security device; and
in response to determining the threat level meets or exceeds the maximum threat level or the maximum threat level range set by the security device, modulating the gate of the security device to an open position, creating the air gap between the first port and the second port, preventing the network traffic from passing through the security device to the network computer system.

11. The computer system of claim 8, further comprising:
prior to said opening or closing the gate,
transmitting metadata or compressed data of the network traffic to a cloud-based analytics determining a correlation between a threat of the network traffic and known threats to computer systems; and
receiving from the cloud-based analytics, a decision to modulate the gate of the security device into an open or closed position as a function of the correlation between the threat of the network traffic and the known threats to the computer systems, wherein opening the gate creates an air gap between the second port and the first port, preventing the network traffic from passing from the network hardware through the security device and to the network computer system and closing the gate releases the network traffic from the buffer, allowing the network traffic to pass through the security device and to the network computer system.

12. The computer system of claim 8, wherein the security device is part of a network of security devices comprising a plurality of security devices analyzing the network traffic intercepted by each security device within the network of security devices for threat levels exceeding the pre-set safe level, and the analysis of the network traffic performed by each security device within the network of security devices is shared amongst the network of security devices.

13. The computer system of claim 8, wherein the security device is a pluggable dongle, and the gate is a physical gate or logical gate.

14. The computer system of claim 8, wherein the step of modulating the gate of the security device as a function of the threat level is managed by an out-of-band management network connected to the security device.

15. A computer program product comprising:
one or more computer-readable storage media having computer-readable program instructions stored on the one or more computer-readable storage media, said program instructions executes a computer-implemented method comprising:
intercepting, by a security device connected inline between a first port placed in communication with a network computer system and a second port placed in communication with network hardware of a computer network, network traffic of the computer network flowing from the network hardware to the network computer system;
analyzing the network traffic intercepted by the security device for a threat level exceeding a pre-set safe level;
modulating a gate of the security device as a function of the threat level, wherein opening the gate in response to security threat creates an air gap preventing network traffic from passing from the second port through the security device to the first port in communication with the network computer system;
determining, by the security device, that the threat level of the network traffic exceeds the pre-set safe level;
further determining, by the security device, that the threat level of the network traffic is less than a maximum threat level or maximum threat level range set by the security device;
buffering the network traffic received by the security device in an on-board buffer, preventing the network traffic from entering the network computer system; and
in response to said buffering, opening or closing the gate.

16. The computer program product of claim 15, further comprising:
determining, by the security device, that the threat level of the network traffic meets or is below the pre-set safe level; and
modulating the gate of the security device to a closed position, allowing the network traffic to pass from the second port through the security device and through the first port into to the network computer system.

17. The computer program product of claim 15, further comprising:
determining, by the security device, that the threat level of the network traffic exceeds the pre-set safe level;

further determining, by the security device, that the threat level of the network traffic meets or exceeds a maximum threat level or maximum threat level range set by the security device; and in response to determining the threat level meets or exceeds the maximum threat level or the maximum threat level range set by the security device, modulating the gate of the security device to an open position, creating the air gap and preventing the network traffic from passing through the security device to the network computer system.

18. The computer program product of claim 15, further comprising:

prior to said opening or closing the gate, transmitting metadata or compressed data of the network traffic to a cloud-based analytics determining a correlation between a threat of the network traffic and known threats to computer systems; and receiving from the cloud-based analytics, a decision to modulate the gate of the security device into an open or closed position as a function of the correlation between the threat of the network traffic and the known threats to the computer systems, wherein opening the gate creates an air gap between the second port and the first port, preventing the network traffic from passing from the network hardware through the security device and to the network computer system and closing the gate releases the network traffic from the buffer, allowing the network traffic to pass through the security device and to the network computer system.

19. The computer program product of claim 15, wherein the security device is part of a network of security devices comprising a plurality of security devices analyzing the network traffic intercepted by each security device within the network of security devices for threat levels exceeding the pre-set safe level, and the analysis of the network traffic performed by each security device within the network of security devices is shared amongst the network of security devices.

20. The computer program product of claim 15, wherein the security device is a pluggable dongle, and the gate is a physical gate or logical gate.

* * * * *